United States Patent [19]
Grivsky

[11] 3,742,014
[45] June 26, 1973

[54] PREPARATION OF BENZONITRILES

[75] Inventor: Eugene M. Grivsky, Chapel Hill, N.C.

[73] Assignee: Burroughs Wellcome Co., a Corp. of North Carolina and Wellcome Foundation Ltd., London, England

[22] Filed: May 28, 1971

[21] Appl. No.: 148,172

[30] Foreign Application Priority Data
May 29, 1970 Great Britain.................. 25,984/70

[52] U.S. Cl. ...... 260/465 B, 260/465 E, 260/465 G
[51] Int. Cl.................. C07c 121/02, C07c 121/52
[58] Field of Search................. 260/999; 260/465 B, 260/465 G

[56] References Cited
OTHER PUBLICATIONS
Horning: Organic Syntheses, Col. Vol. III, pp. 646–648, John Wiley & Sons, Inc. (1955)
Migrdichian: The Chemistry of Organic Cyanogen Compounds, Reinhold Publ. Corp., p. 29 (1947).

Primary Examiner—Lewis Gotts
Assistant Examiner—Dolph H. Torrence
Attorney—Sewall P. Bronstein, John D. Woodberry, Robert T. Gammons, Donald Brown, Robert L. Goldberg and Robert F. O'Connell

[57] ABSTRACT

A method of preparing a benzonitrile of the formula

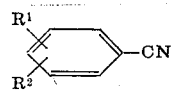

wherein $R^1$ is a substituent nitro group and $R^2$ is a substituent halogen atom, which comprises reacting an $R^1$, $R^2$-benzoyl chloride with an alkanesulphonyltrichlorophosphazene at a temperature of between 150° C. and 190° C. The benzonitrile products are useful as intermediates in the preparation of amidino ureas having anti-malarial activity.

37 Claims, No Drawings

PREPARATION OF BENZONITRILES

This invention relates to the preparation of benzonitriles.

Methods for preparing benzonitriles are well-known in the art, the corresponding benzoic acids commonly being used as starting materials. One such method involves conversion of the acid to its chloride and thence to its amide followed by dehydration of the latter by reaction with thionyl chloride in benzene or toluene, as represented by the following reaction scheme (I)

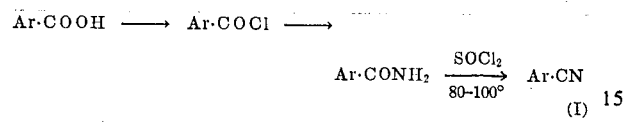

An alternative preparation (see, for example, Org. Synth., Col. Vol. III, 646) is to heat the acid with one equivalent of an arylsulphonamide and two equivalents of phosphorus pentachloride. p-Toluenesulphonamide is commonly used, the reaction being represented by the scheme (II)

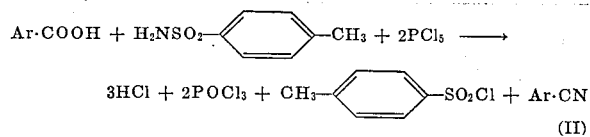

Both of the above methods possess disadvantages when the deisred benzonitrile product is of formula (III)

wherein $R^1$ is a substituent nitro group and $R^2$ is a substituent halogen atom. Method (I) is slow and gives low yields after reasonable times of reaction whilst method (II), although affording a variety of nitriles not obtainable by method (I), gives a relatively poor yield in a number of cases. An additional disadvantage of method (II) is that once the reactants have been initially heated together the reaction is exothermic and difficult to control, although some degree of moderation may be affected by conducting the reaction under an inert atmosphere such as nitrogen.

The benzonitriles of formula (III) are valuable among other things as intermediates for producing by reduction the corresponding anilines of formula X, the substituent nitro group $R^1$ being converted to an amino group by the use of a reducing agent such as, for example, stannous chloride in the presence of hydrochloric acid, or iron and acetic acid as shown in the following reaction scheme

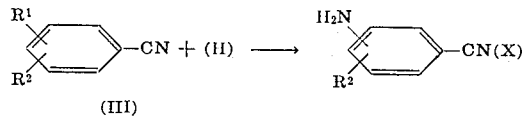

Preferred compounds of formula (III) are those wherein the substituent halogen atom is chlorine, bromine, fluroine or iodine; the most preferred compounds are those wherein the halogen is chlorine.

The anilines referred to above are useful for conversion to 1-amidino-3-phenyl ureas XI such as those described in U.S. application Ser. No. 650,225, filed June 30, 1967, now U.S. Pat. No. 3,539,616, granted Nov. 10, 1970, Belgian Patent Specification No. 700895 granted 4/1/68, which show activity against various malaria parasites.

For example, one method of synthesis for the preparation of 1-amidino-3-phenyl ureas XI from the compound of formula X is shown by the following reaction scheme

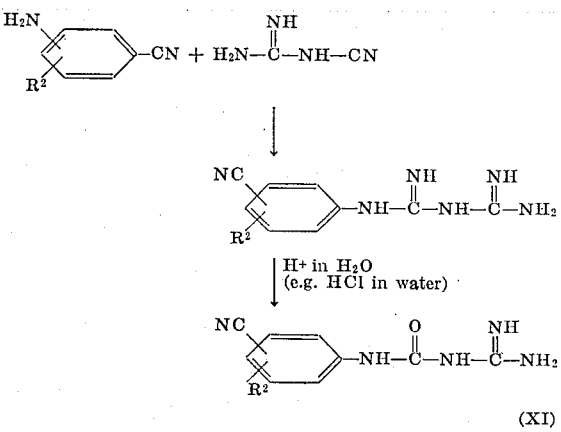

The compounds of formula XI as well as the pharmaceutically acceptable acid addition salts thereof are all useful as antimalarials. In particular the compounds of formula XI are active against P.Gallinaceum in chicks and P. Vinckei and P. Berghei in mice.

For the treatment or prophylaxis of malaria the compounds may be presented in tablet form or as an injectable solution. In treating infections in animals and mammals (e.g., man), a dose of from 1 to 100 mg/kg of bodyweight would be used.

It has now been found that, for the preparation of benzonitriles of formula (III) by method (II), when the arysulphonamide is replaced by a lower alkanesulphonamide, for example, methanesulphonamide, ethanesulphonamide, propylsulphonamide, butylsulphonamide (e.g., n-butylsulphonamide) etc, several important advantages are obtained:

a. The reaction proceeds more smoothly and requires a lower final temperature — 175°–180° C as compared with 210°–230°C.

b. The method is more generally applicable and the yields are consistently good, 85 percent or more of the theoretical value.

c. Isolation and purification of the product are much simplified as only the nitrile product is insoluble in water.

The process of the present invention may be carried out in the same manner as previously described for the preparation of nitriles using p-toluenesulphonamide, except for the final thermal conditions. When the alkanesulphonamide used is methanesulphonamide the overall reaction of the present invention may be represented by the scheme (IV) $Ar\cdot COOH + CH_3SO_2NH_2 + 2PCl_5$

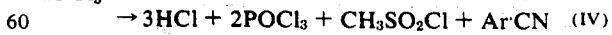
$\rightarrow 3HCl + 2POCl_3 + CH_3SO_2Cl + Ar\cdot CN$ (IV)

As preferably carried out, the reactants shown in scheme (IV) are present in the ratio of one mole of the benzoic acid, one mole of methanesulphonamide and two moles of phosphorus pentachloride, as shown. The reactants are mixed together in a reaction vessel having distillation means and warmed cautiously to a temperature not exceeding 90° C whilst three moles of hydrogen chloride are evolved. The temperature of the reaction mixture may then be raised gradually to the final level of around 180° C whilst two moles of phosphorus oxychloride distill off and the reaction is completed with formation of the nitrile.

Formation of the nitrile is believed to begin at a temperature of about 150° C, and proceeds at a convenient rate at 180°.

According to the present invention in one aspect therefore there is provided a method of preparing a benzonitrile of the formula (III) which comprises reacting the corresponding benzoic acid with a lower alkanesulphonamide (preferably one to four carbons) and phosphorus pentachloride, at a temperature of preferably not less than about 150° C and not more than 190° C. and most preferably between 175° C to 180° C.

Examination of the successive formation of intermediates and by-products during the course of the reaction shown by scheme (IV) suggests that the reaction proceeds as follows:

a. when the temperature of the reaction mixture is below 90° C., i. The benzoic acid reacts with one mole of phosphorus pentachloride to give the benzoyl chloride and one mole each of phosphorus oxychloride and hydrogen chloride:

$$Ar\cdot COOH + PCl_5 \rightarrow HCl + POCl_3 + Ar\cdot COCl$$

(V)

ii. The methanesulphonamide reacts with the second mole of phosphorus pentachloride to give methanesulphonyltrichlorophosphazene and the other two moles of hydrogen chloride:

$$CH_3SO_2NH_2 + PCl_5 \rightarrow CH_3SO_2N{:}PCl_3 + 2HCl$$

(VI)

The methanesulphonyltrichlorophosphazene is an identifiable solid which b. reacts with the benzoyl chloride from (V) at a temperature greater than about 150° C. to yield the benzonitrile by elimination of methanesulphonyl chloride and the second mole of phosphorus oxychloride:

$$Ar\cdot COCl + CH_3SO_2N{:}PCl_3 \rightarrow POCl_3 + CH_3SO_2Cl + Ar\cdot CN$$

(VII)

It will be appreciated from the foregoing that the benzonic acid used as starting material in (IV) may be replaced by the benzoyl chloride, when only one mole of phosphorus pentachloride is required and the reaction follows the scheme:

$$Ar\cdot COCl + CH_3SO_2NH_2 + PCl_5$$

(VIII)

$$\rightarrow POCl_3 + 2HCl + CH_3SO_2Cl + Ar\cdot CN$$

It will also be appreciated, from (VIII), that the benzonitrile may be prepared by the direct reaction between the benzoyl chloride and methanesulphonyltrichlorophosphazene.

Thus in another aspect the present invention provides a method of preparing a benzonitrile of the formula (III) which comprises reacting the corresponding benzoyl chloride with an alkanesulphonamide and phosphorus pentachloride, at a temperature of not less than about 150° C and not more than 190° C.

In yet another aspect the present invention provides a method of preparing a benzonitrile of the formula (III) which comprises reacting the corresponding benzoyl chloride with an alkanesulphonyltrichlorophosphazene at a temperature of preferably not less than about 150° C and not more than 190° C, and most preferably 175° C to 180° C wherein the benzoyl chloride is optionally prepared in situ by reacting the corresponding benzoic acid with phosphorus pentachloride, and wherein the alkanesulphonyltrichlorophosphazene is optionally prepared in Situ by reacting the corresponding alkanesulphonamide with phosphorus pentachloride.

In another aspect the present invention provides the benzonitriles of formula (III) when prepared by any of the methods provided hereinbefore.

The final products of the process of the invention, as exemplified by scheme (IV), are hydrogen chloride, phosphorus oxychloride, methanesulphonyl chloride and the benzonitrile, of which the former two are eliminated from the reaction mixture by distillation. Excess phosphorus pentachloride and the methanesulphonyl chloride may be removed by treating the mixture with a cold, preferably aqueous organic or inorganic base. Dilute ammonium hydroxide and dilute aqueous solutions of alkali metal hydroxides or carbonates are suitable, but dilute ammonium hydroxide is preferred since the methanesulphonamide starting material is produced by the reaction $$CH_3SO_2Cl + NH_4OH \rightarrow H_2O + HCl + CH_3SO_2NH_2$$

(IX)

and may be recovered if desired. The benzonitrile product from (IV) is preferably collected by filtration and is essentially pure at this point but may be recrystallised from appropriate solvents if desired, or purified by sublimation.

Table I at the end of the following Examples shows the results of two series of experiments wherein a variety of benzoic acids were converted to the corresponding benzonitriles, p-toluenesulphonamide being used in the one series and methanesulphonamide in the other. The latter series in all instances involving the method of the present invention as given in Examples 1–4 gave the better results in all cases.

The invention will now be described with reference to the folloiwng Examples. All temperatures are in degrees Celsius.

EXAMPLE 1

Methanesulphonamide (9.5 g., 0.1 mole) and phosphorus pentachloride (21.0 g., 0.1 mole) were gently heated together under nitrogen and the mixture maintained at a temperature of 60° C. for 1 hour. Evolution of hydrogen chloride began at 40° C; the gas evolved was trapped and titrated, the theoretical amount (two equivalents) being recorded. The reaction mixture was then heated at 90° C. for 10 minutes when a white liquid formed which on cooling gave white hygroscopic crystals of methanesulphonyltrichlorophosphazene, $CH_3SO_2N{:}PCl_3$, in almost quantitative yield. This compound was recrystallised from a 1:8 benzene-hexane mixture, m.p.55°–56° C. in a sealed melting-point tube. (Maximum precautions should be taken when manipulating this compound as it is markedly vesicant and caused painful end severe skin reactions).

Analysis : Calculated for $CH_3SO_2N:PCl_3$ : C=5.21; H=1.31; N=6.1

Found : C=5.40; H=1.50; N=6.3

To the crude phosphazene was added over a period of 10 minutes and under a nitrogen atmosphere (flow) a total of 22.0 g. (0.1 mole) of 3-chloro-2-nitrobenzoyl chloride, obtained from the reaction of 3-chloro-2-nitrobenzoic acid with thionyl chloride and recrystallised (m.p. 61° C.) from a 1:8 benzene-pentane mixture (Analysis : Calculated C=38.21; H=1.37; N=6.36. Found C=38.29; H=1.17; N=5.93). With the addition completed the temperature of the mixture was slowly raised to 150° C. to initiate the pyrolytic reaction and maintained at this level for 10 to 15 minutes. Finally the temperature was progressively raised to around 180° C. when the theoretical quantity, one equivalent, of phosphorus oxychloride distilled over during 20 minutes. The reaction mixture was then cooled and treated with crushed ice and dilute ammonium hydroxide; the solid, crude product was filtered off and purified by sublimation under reduced pressure to give 16.2 g. of 3-chloro-2-nitrobenzonitrile. m.p. 85° C., 88 percent yield.

Analysis : Calculated for $C_7H_3ClN_2O_2$ : C=46.03; H=1.64; Cl=19.45; N=15.35.

Found : C=46.32; H=1.90; Cl=19.60; N=15.10.

EXAMPLE 2

3-Chloro-5-nitrobenzoic acid (20.1g., 0.1M), methanesulphonamide (9.5g., 0.1M) and phosphorus pentachloride (42g., 0.2M) were stirred together under nitrogen. An initial exothermic reaction took place during which the temperature of the mixture rose to 50°-60°C., three equivalents of hydrogen chloride were evolved and the reaction mixture became liquid. The temperature of the reaction mixture was then slowly raised to 180° C and maintained near this for 30 minutes until no more phosphorus oxychloride distilled over, 0.1M of this latter being recovered at 145°-150°C and a second 0.1M at 175°-182°C. At the end of this distillation period some methanesulphonyl chloride distilled over also. The reaction mixture was then cooled and cold dilute ammonium hydroxide added. The solid, crude product was filtered off and recrystallised from a benzenehexane mixture to give pure 3-chloro-5-nitrobenzonitrile, m.p. 93° C., in 90 percent yield.

EXAMPLE 3

2-Chloro-3-nitrobenzoic acid (20.2g., 0.1M), methanesulphonamide (9.5g., 0.1M) and phosphorus pentachloride (42g., 0.2M) were gently heated together under nitrogen, evolution of hydrogen chloride occurring over the temperature range 40°-60°C. When this evolution had subsided and the reaction mixture had become liquid, due to the formation of phosphorus oxychloride, the temperature of the mixture was slowly raised to 160° C and maintained at this for 20 minutes until no more phosphorus oxychloride distilled over. The mixture was then heated to 185° C and this temperature maintained for 30 minutes whilst more phosphorus oxychloride distilled. The cooled reaction mixture was then treated with crushed ice and dilute ammonium hydroxide and the solid, crude 2-chloro-3-nitrobenzonitrile thus obtained filtered off, washed with water, dried and recrystallised from aqueous ethanol to give 16.5g. of purified product, m.p. 104°, yield 90 percent.

EXAMPLE 4

A mixture of 2-bromo-4-nitrobenzoic acid (12.1g, 0.05M), methanesulphonamide (4.8g., 0.05M) and phosphorus pentachloride (21g., 0.1M) was gently heated under nitrogen; hydrogen chloride was evolved over the temperature range 50°-60° C and the reaction mixture became liquid. The temperature of the mixture was slowly raised to 185° C and maintained at this for 30 minutes until no more phosphorus oxychloride distilled over, 0.05M of this latter being recovered when the temperature was 150°-155° C and a further 0.05M at a temperature of 175°-182°C. The reaction mixture was then cooled and treated with ice and dilute ammonium hydroxide and the nitrile isolated as before. 2-Bromo-4-nitrobenzonitrile, m.p. 126° C., was obtained in 91 percent yield.

EXAMPLE 5

Preparation of 4-amino-2-chlorobenzonitrile

To a solution of stannous chloride ($SnCl_2 \cdot 2H_2O$) (40 g., 0.17M) in concentrated hydrochloric acid (25 ml. of 37 percent) at 20° C, portions of 2-chloro-4-nitrobenzonitrile (6.1 g., 0.034M in total) are added over 20 minutes, with stirring and external cooling when necessary to keep the temperature below 30° C. After all the reactant has been added, the reaction mixture (a yellow slurry) is stirred for 2-3 hours and then some excess hydrochloric acid added, followed by 40 percent caustic soda solution until an alkaline pH is obtained. It is necessary to stir mechanically and cool during this operation to keep the temperature at about 25° C.

After standing for about 30 minutes the crude product is filtered off and washed with water until free from alkali. It is then recrystallised from an ether/hexane mixture to give 4.8 g. (96 percent yield) of 4-amino-2-chloro-benzonitrile m.p. 108-110° C. This may be further recrystallised from water.

Example 6

Preparation of 2-chloro-5-aminobenzonitrile

A mixture of 2-chloro-5-nitrobenzonitrile (9.1 g., 0.05 mole) in 124 ml. of glacial acetic acid and anhydrous stannous chloride, $SnCl_2$ (40.0 g., ca. 0.2 mole), was heated to 95°-100°C with stirring and dry hydrogen chloride was passed into the reaction mixture until it was saturated (45-60 minutes). After standing for 8 hours the tin complex thus formed was filtered off, washed with glacial acetic acid and decomposed by means of 50 ml. of 40 percent sodium hydroxide solution at 10°-15°C in the usual manner. The resultant amine was filtered off, washed with water and dissolved in anhydrous ether. The ether extracts were evaporated by dryness in vacuo to give 6.3 g. of 2-chloro-5-aminobenzonitrile (yellow needles), m.p. 133° C (yield 83 percent). This product may be further purified by sublimation in vacuo to give white crystals, m.p. 135-6°.

Example 7

4-Chloro-3-cyanoaniline (6.1 g.), dicyandiamide (3.7 g.), water (16 ml.) and concentrated hydrochloric acid (3.6 ml.) were heated under reflux for 30 minutes. With cooling a hydrochloride crystallised which was collected by filtration and washed with a little water. This crude salt was dried and recrystallised from alcohol. 4-Chloro-3-cyanophenyl-biguanide hydrochloride then separated as white needles (6.4 g.), m.p. 233° with effervescence. The base was obtained as small white needles when the solution of this salt was made alkaline with sodium hydroxide; recrystallised from alcohol, it formed colourless prisms, m.p. 202° with effervescence.

The biguanide base (3.2 g.) was dissolved in N-ethanesulphonic acid (32 ml.) and kept at 90° for 2 hours, during which period colourless crystals of 1-amidino-3-(4-chloro-3-cyanophenyl) urea ethanesulphonate separated. This salt was collected after cooling (2.8 g.), and was recrystallised from methanol (or water) and formed white needles, m.p. 219°. The base was obtained by treating an aqueous solution of the salt with sodium hydroxide. It formed white needles, m.p. 222°, which could be further purified by recrystallisation from alcohol. This substance was sparingly soluble in water.

Example 8

By the method of the previous example, 3-chloro-4-cyanoaniline was converted to 3-chloro-4-cyanophenylbiguanide hydrochloride, which formed white matted needles from methanol, m.p. 256° with effervescence (the corresponding base formed white prisms from alcohol, m.p. 184°).

The biguanide (5 g.) was dissolved in 0.5N-ethanesulphonic acid (100 ml.) and the solution was kept at 90° for 2 hours. With cooling, a high yield of 1-amidino-3-(3-chloro-4-cyanophenyl) urea ethanesulphonate crystallised in white prisms, m.p. 222° (the corresponding base crystallised from alcohol had a m.p. 211°).

Table I

| Product benzonitrile | M.P., °C | Yields, %, using p-Toluene sulphonamide | Methane sulphonamide |
|---|---|---|---|
| 2-chloro-3-nitro | 104 | 54 | 90 |
| 2-chloro-4-nitro | 81 | 90 | 95 |
| 2-chloro-5-nitro | 107 | 93 | 95 |
| 2-chloro-6-nitro | 124 | 75 | 90 |
| 3-chloro-2-nitro | 85 | 83 | 88 |
| 3-chloro-4-nitro | 86 | 58 | 90 |
| 3-chloro-5-nitro | 93 | 66 | 90 |
| 3-chloro-6-nitro | 97 | 50 | 90 |
| 4-chloro-2-nitro | 98 | 70 | 95 |
| 4-chloro-3-nitro | 103 | 70 | 90 |
| 2-fluoro-4-nitro | 76 | 60 | 96 |
| 2-fluoro-5-nitro | 79 | 60–70 | 85 |
| 2-bromo-4-nitro | 126 | 30–40 | 91 |

What we claim is:

1. A method of preparing a benzonitrile of the formula 1

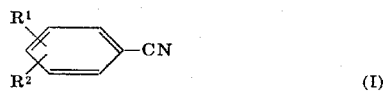
(I)

wherein $R^1$ is a substituent nitro group and $R^2$ is a substituent halogen atom which comprises heating a mixture of an $R^1$, $R^2$ - benzoyl chloride of the formula II

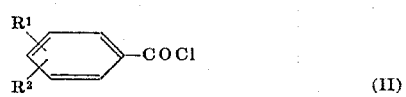
(II)

wherein $R^1$ and $R^2$ have the same meanings as hereinbefore with at least an equimolar amount of alkanesulphonyltrichlorophosphazene of the formula III

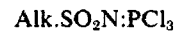

(III)

wherein Alk is an alkyl group having one to four carbon atoms at a temperature of between 150° C and 190° C.

2. A method according to claim 1 wherein the mixture is heated to a temperature of between 175° C. and 180° C.

3. A method according to claim 1 wherein the alkanesulphonyltrichlorophosphazene is methanesulphonyltrichlorophosphazene.

4. The method of claim 3 in which $R^1$ is nitro at the 3 position of the ring and $R^2$ is chloro at the 2 position of the ring.

5. The method of claim 3 in which $R^1$ is nitro at the 4 position of the ring and $R^2$ is chloro at the 2 position of the ring.

6. The method of claim 3 in which $R^1$ is nitro at the 5 position of the ring and $R^2$ is chloro at the 2 position of the ring.

7. The method of claim 3 in which $R^1$ is nitro at the 6 position of the ring and $R^2$ is chloro at the 2 position of the ring.

8. The method of claim 3 in which $R^1$ is nitro at the 2 position of the ring and $R^2$ is chloro at the 3 position of the ring.

9. The method of claim 3 in which $R^1$ is nitro at the 4 position of the ring and $R^2$ is chloro at the 3 position of the ring.

10. The method of claim 3 in which $R^1$ is nitro at the 5 position of the ring and $R^2$ is chloro at the 3 position of the ring.

11. The method of claim 3 in which $R^1$ is nitro at the 6 position of the ring and $R^2$ is chloro at the 3 position of the ring.

12. The method of claim 3 in which $R^1$ is nitro at the 2 position of the ring and $R^2$ is chloro at the 4 position of the ring.

13. The method of claim 3 in which $R^1$ is nitro at the 3 position of the ring and $R^2$ is chloro at the 4 position of the ring.

14. The method of claim 3 in which $R^1$ is nitro at the 4 position of the ring and $R^2$ is fluoro at the 2 position of the ring.

15. The method of claim 3 in which $R^1$ is nitro at the 5 position of the ring and $R^2$ is fluoro at the 2 position of the ring.

16. The method of claim 3 in which $R^1$ is nitro at the 4 position of the ring and $R^2$ is bromo at the 2 position of the ring.

17. The method according to claim 1 wherein the substituent $R^2$ is an atom of chlorine.

18. A method according to claim 1 wherein the $R^1$,$R^2$-benzoyl chloride is 2-chloro-4-nitro-benzoyl chloride.

19. A method according to claim 1 wherein the $R^1$,$R^2$-benzoyl chloride and the alkanesulphonyltrichlorophosphazene are present in equimolar amounts.

20. A method according to claim 1 wherein an aqueous base is used to precipitate the product benzonitrile.

21. A method according to claim 1 wherein ammonium hydroxide is used to precipitate the product benzonitrile.

22. A method according to claim 1 wherein the R¹, R²-benzoyl chloride is prepared in situ by reacting the R¹, R²-benzoic acid of the formula

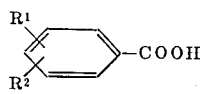

wherein R¹ and R² have the meaning hereinbefore with at least an equimolar amount of phosphorus pentachloride.

23. A method according to claim 22 wherein the R¹,R²-benzoic acid and the phosphorus pentachloride are present in equimolar amounts.

24. A method according to claim 22 wherein the R¹,R²-benzoyl chloride is reacted with the alkanesulphonyltrichlorophosphazene at a temperature of between 175° C. and 180° C.

25. A method according to claim 22 wherein the alkanesulphonyltrichlorophosphazene is methanesulphonyltrichlorophosphazene.

26. A method according to claim 22 wherein the substituent R² is an atom of chlorine.

27. A method according to claim 22 wherein the R¹,R²-benzoyl chloride is 2-chloro-4-nitrobenzoyl chloride.

28. A method according to claim 22 wherein an aqueous base is used to precipitate the product benzonitrile.

29. A method according to claim 22 wherein ammonium hydroxide is used to precipitate the product benzonitrile.

30. A method according to claim 1 wherein the alkanesulphonyltrichlorophosphazene is prepared in situ by reacting an alkanesulphonamide of the formula

wherein Alk is as defined in claim 1 with at least an equimoler amount of phosphorus pentachloride.

31. A method according to claim 30 wherein the alkanesulphonamide and the phosphorus pentachloride are present in equimolar maounts.

32. A method according to claim 30 wherein the R¹,R²-benzoyl chloride is reacted with the alkanesulphonyltrichlorophosphazene at a temperature of between 175° O. and 180° C.

33. A method according to claim 30 wherein the alkanesulphonyltrichlorophosphazene is methanesulphonyltrichlorophosphazene.

34. A method according to claim 30 wherein the substituent R² is an atom of chlorine.

35. A method according to claim 30 wherein the R¹,R²-benzoyl chloride is 2-chloro-4-nitrobenzoyl chloride.

36. A method according to claim 30 wherein an aqueous base is used to precipitate the product benzonitrile.

37. A method according to claim 30 wherein ammonium hydroxide is used to precipitate the product benzonitrile.

* * * * *